United States Patent
Belliveau (10) Patent No.: US 7,011,429 B2
(45) Date of Patent: Mar. 14, 2006

(54) COLOR MODIFYING EFFECTS FOR IMAGE PROJECTION LIGHTING DEVICES

(76) Inventor: Richard S. Belliveau, 10643 Floral Park, Austin, TX (US) 78759

( * ) Notice: Subject to any disclaimer, the term of this patent is extended or adjusted under 35 U.S.C. 154(b) by 0 days.

(21) Appl. No.: 11/200,450

(22) Filed: Aug. 9, 2005

(65) Prior Publication Data

US 2005/0270759 A1    Dec. 8, 2005

Related U.S. Application Data

(62) Division of application No. 10/615,863, filed on Jul. 9, 2003, now Pat. No. 6,971,764.

(51) Int. Cl.
*B60Q 1/124*    (2006.01)
*F21V 33/00*    (2006.01)

(52) U.S. Cl. .................. 362/233; 362/253; 353/25

(58) Field of Classification Search ............... 362/233, 362/276, 284, 324, 802, 286, 257, 253; 353/25, 353/31, 33, 34, 37; 344/5, 7, 8
See application file for complete search history.

(56) References Cited

U.S. PATENT DOCUMENTS

| | | | | |
|---|---|---|---|---|
| 4,701,833 A | * | 10/1987 | Bornhorst | 362/294 |
| 5,010,459 A | * | 4/1991 | Taylor et al. | 362/233 |
| 5,406,176 A | * | 4/1995 | Sugden | 362/233 |
| 5,502,627 A | * | 3/1996 | Hunt et al. | 362/286 |
| 5,769,527 A | * | 6/1998 | Taylor et al. | 362/233 |
| 5,829,868 A | | 11/1998 | Hutton | 362/276 |
| 6,057,958 A | | 5/2000 | Hunt | 359/291 |
| 6,188,933 B1 | * | 2/2001 | Hewlett et al. | 359/291 |

* cited by examiner

*Primary Examiner*—John Anthony Ward
*Assistant Examiner*—Bao Q Truong
(74) *Attorney, Agent, or Firm*—Walter J. Tencza, Jr.

(57) ABSTRACT

A stage lighting apparatus is disclosed comprised of a lamp housing. The lamp housing is comprised of a lamp and a first light valve. The stage lighting apparatus is also comprised of a first set of first image data. The first set of first image data is comprised of a first set of first separate color data for operation of a first separate colored image and a second set of second separate color data for operation of a second separate colored image. A swap function is applied to the first set of first image data to allow operation of the second separate colored image as determined by the first separate color data.

15 Claims, 5 Drawing Sheets

COLOR MODIFYING EFFECTS FOR IMAGE PROJECTION LIGHTING DEVICES

CROSS REFERENCE TO RELATED APPLICATION(S)

The present application is a divisional of and claims the priority of U.S. patent application Ser. No. 10/615,863, titled "COLOR MODIFYING EFFECTS FOR IMAGE PROJECTION LIGHTING DEVICES", inventor Richard S. Belliveau, filed on Jul. 9, 2003 now U.S. Pat. No. 6,971,764.

FIELD OF THE INVENTION

This invention relates to image projection lighting devices.

BACKGROUND OF THE INVENTION

The embodiments of the present invention generally relate to lighting systems that are digitally controlled and to the lighting fixtures used therein, in particular multiparameter lighting fixtures having one or more image projection lighting parameters.

Lighting systems are typically formed by interconnecting, via a communications system, a plurality of lighting fixtures and providing for operator control of the plurality of lighting fixtures from a central controller. Such lighting systems may contain multiparameter lighting fixtures, which illustratively are lighting fixtures having two or more individually remotely adjustable parameters such as focus, color, image, position, or other light characteristics. Multiparameter lighting fixtures are widely used in the lighting industry because they facilitate significant reductions in overall lighting system size and permit dynamic changes to the final lighting effect. Applications and events in which multiparameter lighting fixtures are used to great advantage include showrooms, television lighting, stage lighting, architectural lighting, live concerts, and theme parks. Illustrative multi-parameter lighting devices are described in the product brochure entitled "The High End Systems Product Line 2001" and are available from High End Systems, Inc. of Austin, Tex.

A variety of different types of multiparameter lighting fixtures are available. One type of advanced multiparameter lighting fixture, which is referred to herein as an image projection lighting device ("IPLD"), uses a light valve or light valves to project images onto a stage or other projection surface. A light valve, which is also known as an image gate, is a device, such as a digital micro-mirror ("DMD") or a liquid crystal display ("LCD") that forms the image that is to be projected. Other types of light valves that may also be used are liquid crystal on silicone (LCOS) or microelectromechanical systems (MEMs). The light valve's pixels are electronically controlled to form an image by setting the pixels of the light valve to transmit or block light from the lamp of the IPLD.

United States patent application titled "METHOD AND APPARTUS FOR CONTROLLING IMAGES WITH IMAGE PROJECTION LIGHTING DEVICES", inventor Richard S. Belliveau, Ser. No. 10/206,162, filed on Jul. 26, 2002, incorporated by reference herein, describes a central controller incorporating an image editor for use with a plurality of image projection lighting devices.

In their common application, IPLDs are used to project their images upon a stage or other projection surface. Control of the IPLDs is affected by an operator using a central controller that may be located several hundred feet away from the projection surface. In a given application, there may be hundreds of IPLDs used to illuminate the projection surface, with each IPLD having many parameters that may be adjusted to create a scene.

Programming a show on a central controller for a plurality of IPLDs can be very time consuming for an operator. For example a show using thirty or more IPLDs may be constructed by an operator of a central controller of a hundred or more scenes. A scene is programmed by adjusting the many parameters of each of the IPLDs. For each IPLD pan, tilt, selectable image, image rotate, zoom, focus, color and effects may each need to be adjusted.

U.S. Pat. No. 6,057,958, issued May 2, 2000 to Hunt, incorporated herein by reference, discloses a pixel based gobo record control format for storing gobo images in the memory of a light fixture. The gobo images can be recalled and modified from commands sent by a control console. A pixel based gobo image is a gobo (or an image) created by a light valve like a video projection of sorts. A default gobo may have its characteristics modified by changing the characteristics of the matrix and hence, shifting that default gobo in different ways. The matrix operations, which are described, include scaling the gobo, rotation, iris, edge, strobe and dimmer. Hunt discloses, "Other matrix operations are possible. Each of these matrix operations takes the default gobo and does something to it."

U.S. Pat. No. 5,829,868, issued Nov. 3, 1998 to Hutton, incorporated by reference herein, discloses storing video frames as cues locally in a lamp, and supplying them as directed to the image gate to produce animated and real-time imaging. A single frame can also be manipulated through processing to produce multiple variations. Alternatively, a video communication link can be employed to supply continuous video from a remote source.

One example of a prior art image projection lighting device is the Catalyst (trademarked) system available from High End Systems, Inc. of Austin, Tex., and is described in the Catalyst (trademarked) system brochure incorporated herein by reference. The Catalyst (trademarked) image projection lighting device incorporates a video projector with a moveable mirror system that directs the images projected by the projector onto the stage or projection surface. A personal computer is used as a server that provides the images to the projector for projection onto the stage or projection surface. An operator of a central controller sends command signals over a communication system to the Catalyst (trademarked) server to control the selection of images contained at the server. The selected image is then sent by the server to be projected by the video projector. An operator of the central controller may also control various effects that can be applied to the selected image. For example, the Catalyst (trademarked) server may modify the selected image by electronically rotating the orientation of the image before sending the image to the projector to be projected upon the projection surface. Some examples of the types of modifications to the selected image are image rotate, negative image, image strobe, image zoom, RGB (red, green and blue) control and wobble. The different types of modifications of the selected image used to produce the final projected images can be referred to as "effects". An operator of the central controller can send effects commands to the Catalyst (trademarked) image server over the communication system to adjust or select the effects that modify the selected image to produce a final image that is projected onto the projection surface.

The images stored in the Catalyst (trademarked) server are stored electronically as image data in the memory of the server. When an image is selected by an operator of the central controller the central controller sends the appropriate command to the server to command the selected image to be projected by the video projector. A multicolored image projected on a projection surface is comprised of several separate colored images formed by a plurality of light valves. The image data contains data components for operation of each or the separate colored images. A first light valve is used to form the red separate colored image; a second light valve is used to form the green separate colored image and a third light valve is used to form the blue separate colored image. The three separate colored images of red, green and blue (referred to as RGB) are then combined optically and projected as a multicolored image onto the projection surface.

Image data may reside in the memory of an IPLD or the image data may be sent from a central controller over the communications system to be received by a communications port of an IPLD and then projected onto a projection surface. United States patent application titled "Method, apparatus and system for image projection lighting", inventor Richard S. Belliveau, publication no. 20020093296, Ser. No. 10/090,926, filed on Mar. 4, 2002, incorporated by reference herein, describes communications systems that allow image content, such as in the form of digital data, to be transferred from a central controller to a plurality of IPLDS. The images may be still images or animated images.

Images may be projected from the IPLD onto a projection surface such a screen or the stage itself. Images may also be projected by the IPLD onto airborne particulate created by a theatrical fog or smoke machines. The airborne particulate creates a fog or haze and the image projected upon the airborne particulate is seen by the audience as suspended in air. The images that are projected onto airborne particulate are often referred to as aerial images. The images that are projected as aerials can be specially conceived so that the optimum balance of colored, white and dark areas provide the most pleasing and effective aerial projections from the audience perspective.

Images used for projection on a projection surface or for aerials can be stored in a memory electronically. The memory may reside in the IPLD, or the central controller. There is a limit to the number of images that may be available to the operator of the lighting system that resides in the memory and it is an advantage to easily create a second image from a first image data. Creating second images from a first image data allows the operator of the lighting system a greater range of creativity when programming a lighting show by providing a wider range of available images.

SUMMARY OF THE INVENTION

The present invention in one or more embodiments provides a stage lighting apparatus comprised of a lamp housing. The lamp housing is comprised of a lamp and a first light valve. The stage lighting apparatus is also comprised of a first set of first image data. The first set of first image data is comprised of a first set of first separate color data for operation of a first separate colored image and a second set of second separate color data for operation of a second separate colored image. A swap function is applied to the first set of first image data to allow operation of the second separate colored image as determined by the first separate color data.

In one or more embodiments the stage lighting apparatus may be further comprised of a control system. The swap function may be applied to the first set of first image data by the control system. The stage lighting apparatus may be further comprised of a communications port. The communications port may receive a command to cause the swap function to be applied to the first set of first image data. The control system may further receive an input from a keypad located on the stage lighting apparatus to cause the swap function to be applied to the first set of first image data.

DETAILED DESCRIPTION OF THE DRAWINGS

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce the desired results.

Figure 1:
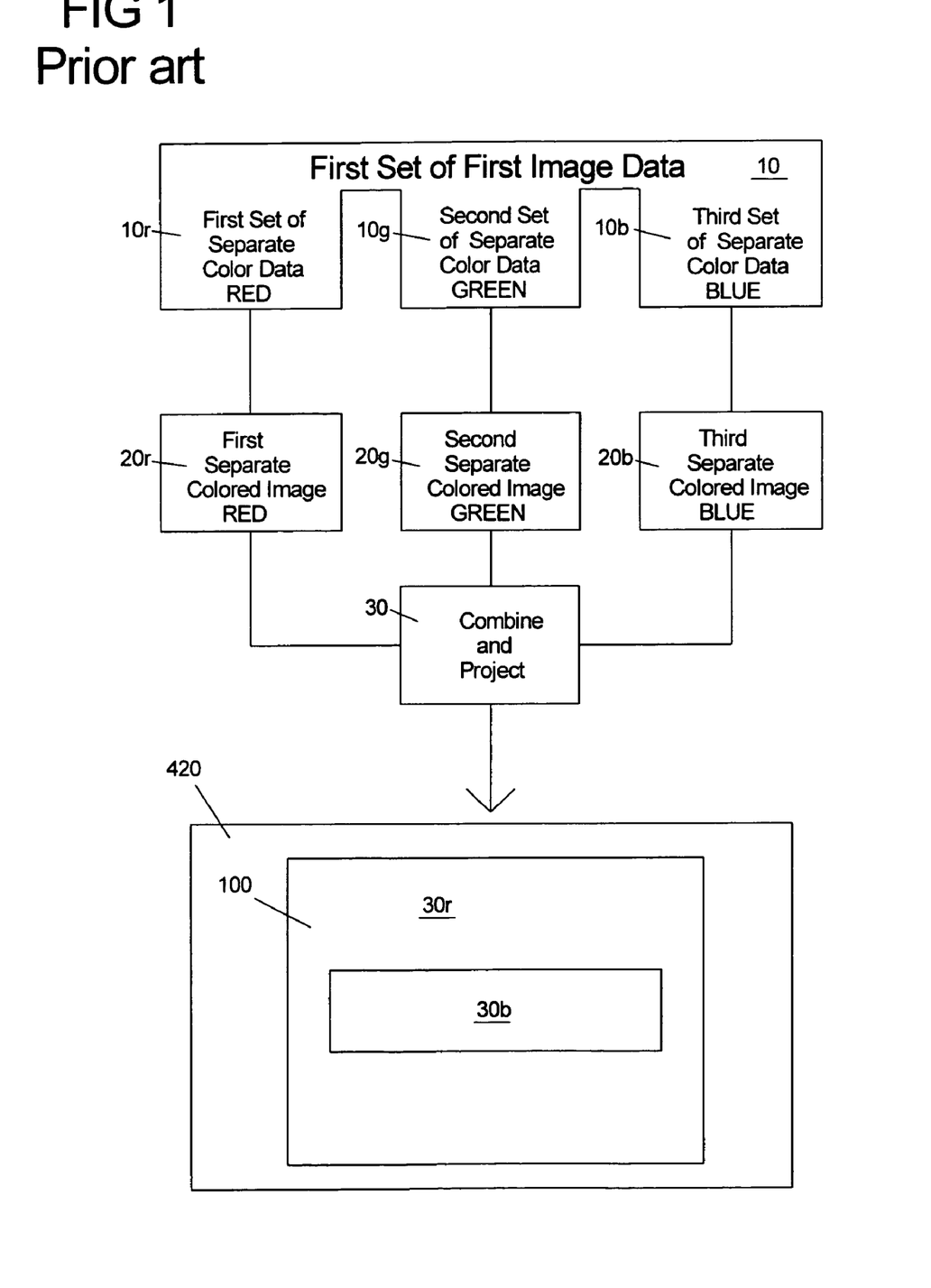
FIG. 1 shows a block diagram of a first set of first image data, which creates a first projected image.

FIG. 1 shows a block diagram of a first set of first image data 10 which includes a first set of first separate color data (RED) 10r, second set of second separate color data (GREEN) 10g, and third set of third separate color data (BLUE) 10b. The components 10r, 10g, and 10b are used to form the first separate colored image 20r (RED), second separate colored image 20g (GREEN), and the third separate colored image 20b (BLUE), respectively, that in turn form a projected image 100. The first set of first separate color data 10r is converted by any suitable means to form the first separate colored image 20r. The second set of second separate color data 10g is converted by any suitable means to form the second separate colored image 20g. The third set of third separate color data 10b is converted by any suitable means to form the third separate colored image 20b.

The three separate colored images 20r (RED), 20g (GREEN) and 20b (BLUE) are combined and projected by any suitable means to project the first image 100 onto a projection surface 420. The layout of the first image 100 is shown visually as a blue stripe 30b on a red background 30r.

The first image 100 is shown as a simple image for ease of comprehension however much more complicated images can be the first image.

Figure 2:
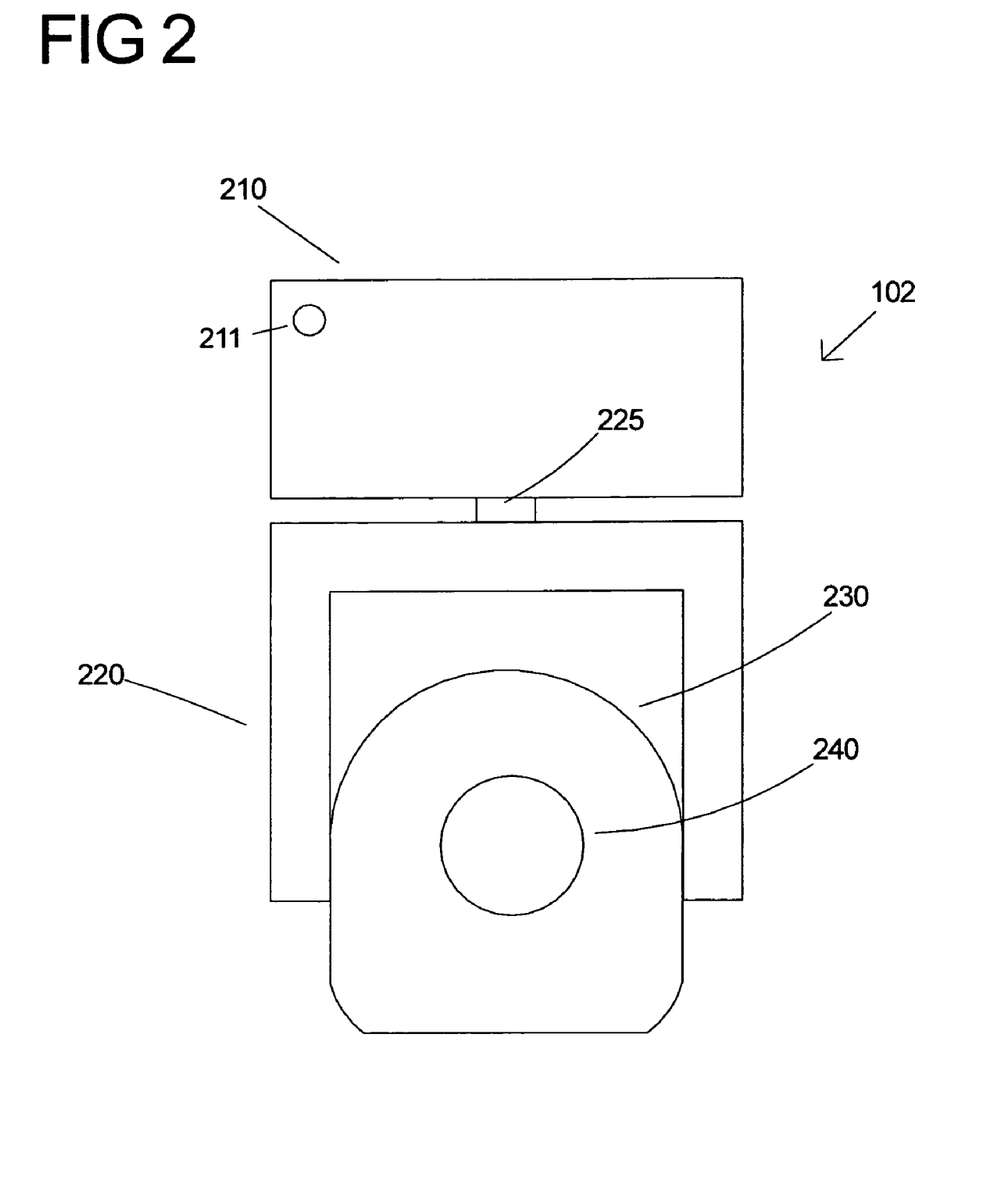
FIG. 2 shows an image projection lighting device for use in accordance with an embodiment of the present invention including a base housing, a yoke and a lamp housing.

FIG. 2 shows a front view of an image projection lighting device 102 incorporating the swap function embodiment of an embodiment of the present invention. The IPLD 102 includes a base or electronics housing 210, a yoke 220, and a lamp housing 230. The IPLDs 102 and 104 of FIG. 4 may each be identical to the IPLD 102 of FIG. 2.

Figure 3:
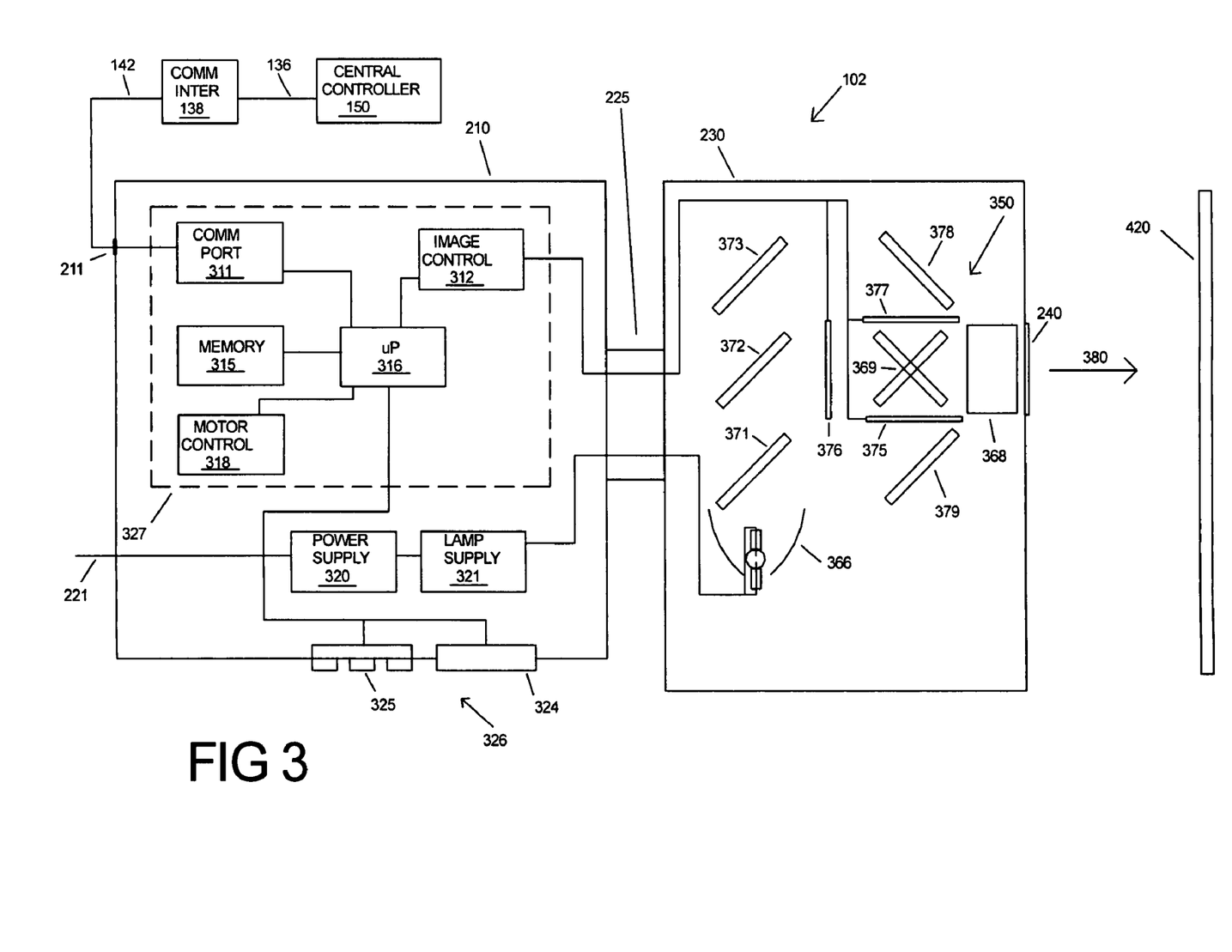
FIG. 3 shows a block diagram of components within the base housing and the lamp housing of the image projection lighting device of FIG. 2.
Figure 4:
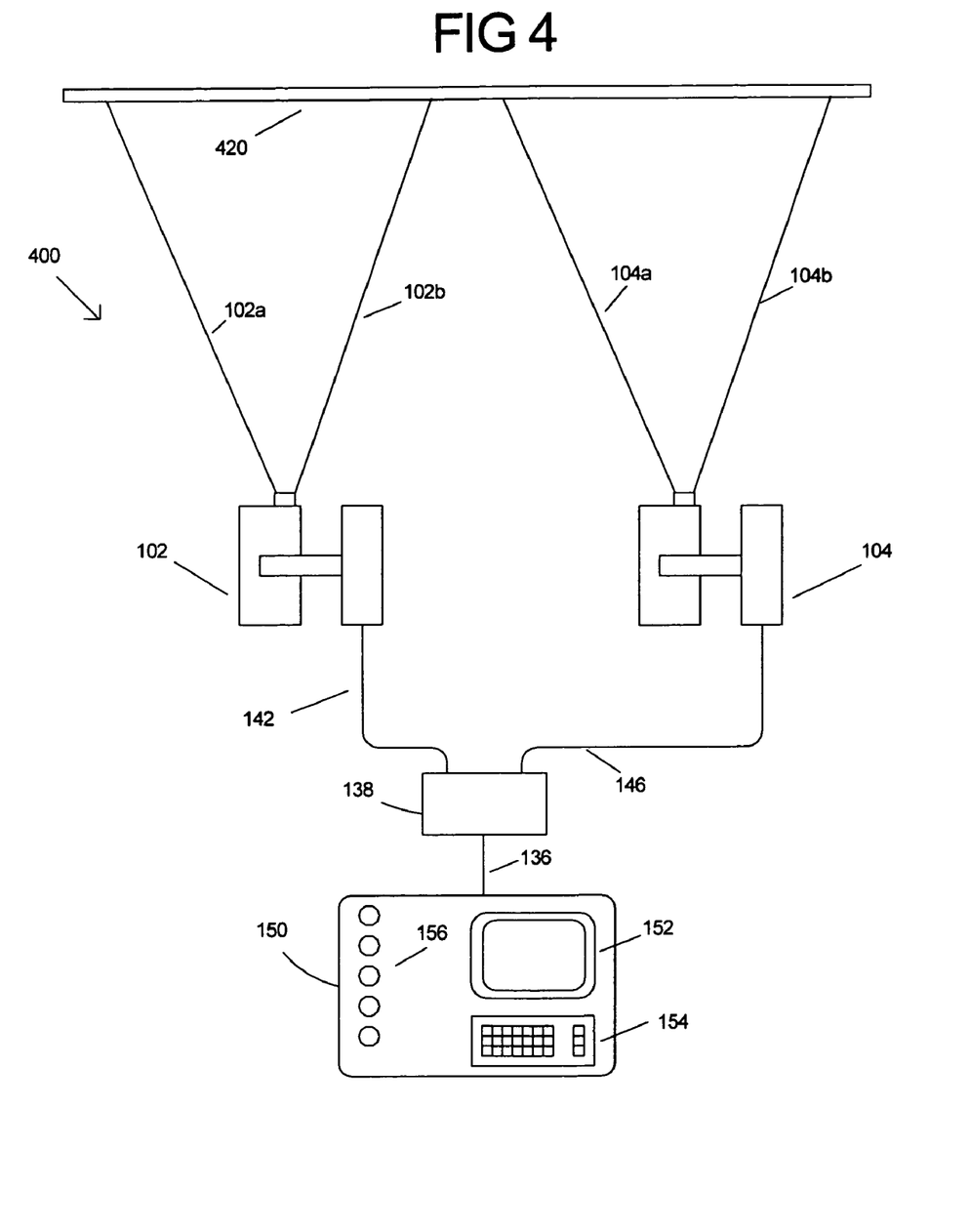
FIG. 4 shows a lighting system in accordance with an embodiment of the present invention.

The base housing 210 of the IPLD 102 includes a communications connection 211 for electrically connecting a communications line, such as communications line 142 shown in FIG. 4. The yoke 220 is physically connected to the housing 210 by a bearing 225, which allows the yoke 220 to pan or rotate in relation to the base or electronics housing 210. The lamp housing 230 is rotatably connected to the yoke 220 (bearings not shown for simplification). The lamp housing 230 typically contains optical components and light valves. An exit aperture 240 is shown for projecting lighted images from a projection lamp, such as a lamp 366 shown in FIG. 3. The projection lamp 366 shown in FIG. 3 is shown as a single lamp but it is known in the art to use two or more projection lamps working as a single projection lamp. IPLD 102 is shown with a separate base housing 210 and lamp housing 230, however it is known in the art to produce an IPLD with a single housing using a mirror to position the projected light.

FIG. 3 is a block diagram showing components within or part of the base housing 210 and within or part of the lamp housing 230 of the IPLD 102. FIG. 3 also shows the central controller 150. An electronic control system 327 can be contained in the base housing 210. The electronic control system 327 is comprised of at least a processing system such as the microprocessor 316. The microprocessor 316 may be made up of discrete electronic parts or the microprocessor 316 may be made up of several processors. The components within or part of the base housing 210 includes a communications port (shown as "comm port") 311, connection point 211, an image control 312, a memory 315, the microprocessor or processor 316, a motor control 318, a motor power supply 320 and a lamp power supply 321. A bearing 225 is shown rotatably connecting the lamp housing 230 to the base housing 210, in FIG. 3, and although only one bearing is shown for simplification more than one bearing may rotatably connect the lamp housing 230 to the base housing 210, i.e. so that the lamp housing 230 can rotate with respect to the base housing 210. A display device 324 is also shown within or connected to the base housing 210. The display device 324 may be a display for alphanumeric characters or a video display capable of displaying video images. An input keypad 325 is also shown mounted with or connected to the base housing 210. The input keypad 325 together with the display device 324 can be called a stand-alone control system 326. The stand-alone control system 326 can be used to enter data and to control the parameters of the IPLD 102.

The components within or part of the lamp housing 230 include the lamp 366 that projects a white light to a red color separation system filter 371. The color separation filter 371 reflects red light from the white light created by the lamp 366 to a reflecting mirror 379 where it is directed to a red light valve 375 and imaged red light passes to a color combining system 369. Blue green light passes though the red color separation filter 371 and is directed to a green color separation filter 372 that in turn reflects green light to a green light valve 376 that passes imaged green light to the color combining system 369. The green separation filter 372 passes blue light that is sent to a blue separation filter 373 and the blue light is reflected off the blue separation filter 373 and passed to a reflector 378. The reflector 378 reflects the blue light to a blue light valve 377 where the imaged blue light is directed to the color combining system 369. The order of the color separation filters may be different. Color combining system 369 combines the imaged red, green and blue light that has been imaged by the red, green and blue light valves 375, 376 and 377 respectively and passes the multicolored lighted images to a zoom and focus lens 368 where it is directed through the aperture 240 in the direction of arrow 380 to the projection surface 420. The red, blue and green light valves 375, 376 and 377 respectively, are controlled to produce images by the image control 312. The image control 312 can be a video graphics card with a memory and a graphics processor. The control signals that are sent to the red, green and blue light valves by the image control 312 create the separate colored images that are combined by the combining system 369 into the multicolored image that is projected onto the projection surface 420. The data that provides the information for the creation of the control signals is derived from the image data of the image that has been selected. The selected image may be a still image or an animated image. The selected image may be stored in the memory 315; the image control 312 or the image may be received from the central controller 150.

The central controller 150 outputs address and control commands over a communications system, which may include communications, interface 138. The communications interface 138 is connected to the communications port 311 by communications line 142 and connection point 211 as shown in FIG. 3. The communications port 311 may be a part of the microprocessor 316. The communications port 311 can be any device capable of receiving the communication sent over the communications system. The communications interface 138 may be a router or hub as known in the communications art. The communications interface 138 may not be required for some communications systems.

The image control 312 of the electronics housing 210 provides control signals to the light valves 375, 376, and 377 in the lamp housing 230. The microprocessor 316 in the electronics housing 210 provides control signals to the image control 312. The microprocessor 316 is shown electrically connected to the memory 315. The memory 315 stores the software operating system for the IPLD 102 and possibly different types of electronic image content or data used to form images at the image control 312. An electronic image that can be stored in the memory 315 is comprised of pixels represented by pixel data.

The light valves shown as 375, 376 and 377 are shown as transmissive type light valves where light from the projection lamp 366 is directed to the light valves to be transmitted through the light valves 375, 376 and 377 to the lens 368. The light valves 375, 376, and 377 may be reflective light valves. In that case, light from the projection lamp 366 would be directed to the light valves 375, 376 and 377 to be reflected from the light valves 375, 376, and 377 to the lens 368.

The motor control 318 is electrically connected to motors. The electrical connection to the motors is not shown for simplification. The motors may be stepping motors, servomotors, solenoids or any other type of actuators. The motor control 318 provides the driving signals to the motors that may be used with the lens 368 and for pan and tilt motors (not shown for simplification).

The motor control 318 is electrically connected to receive control signals from the microprocessor 316. Two power supplies are shown in FIG. 3. A motor power supply 320 is shown for supplying energy to the motors and may also supply power to the electronic components. A lamp power supply 321 is shown for supplying power to the main projection light source or lamp 366.

The IPLD 102 may include at least two different housings, such as the base or electronics housing 210 and the lamp housing 230 to facilitate remote positioning of the lamp housing 230 in relation to the base housing 210. The lamp housing 230 contains the optical components used to project light images upon a stage or projection surface 420 from the lens 368 in the direction of arrow 380, outwards from the IPLD 102. The lamp housing 230 may be connected to a bearing mechanism 225 that facilitates pan and tilting of the lamp housing 230 in relation to the base or electronics housing 210. The bearing mechanism 225 is shown simplified. The motors that would be used for pan and tilt are not shown for simplification.

FIG. 4 shows a lighting system 400 that includes IPLDs 102 and 104. Although only two IPLDs are shown for the lighting system 400 as many as one hundred or more IPLDs can be used to create a show. The central controller 150 has a keyboard input entry device 154 and input entry devices 156 to allow an operator to input commands for controlling the IPLDs 102 and 104. The central controller 150 has a visual display monitor 152 so the operator can see the details of the show that the operator programs on the central controller 150. The central controller 150 may be comprised of the input entry devices 154 and 156 and a computer system in a single housing or multiple computer systems linked together to increase functionality and memory storage.

The commands entered by the operator of the central controller 150 are sent over a communications system using communications lines 136, 142, 146 and communications interface 138 to the IPLDs 102 and 104 of FIG. 4. Each IPLD has an operating address that is different than the operating address of other IPLDs so that the operator can command a specific IPLD from a plurality of IPLDs. The operating address of the IPLD, such as for IPLD 102, can be stored in the memory 315 or stored as a function of the input keypad 325. The desired operating address of the IPLD the operator wishes to control is input into the central controller 150 by inputting to the keyboard 154 or other input device of the central controller 150. The desired operating address is sent over the communication system by the central controller 150 where it is received by the plurality of IPLDs 102 and 104. A receiving IPLD such as IPLD 102 receives the desired operating address at a communications port, such as 311 of FIG. 3. The received operating address is compared with the operating address stored in the memory 315 of FIG. 3 and if the received operating address matches the operating address stored in the memory 315, of IPLD 102 for example, then next the IPLD 102 is ready to receive commands from the central controller 150. Once the desired IPLD has been addressed by the operator of the central controller 150 the operator may next send commands to select a first image or vary the other parameters of the addressed IPLD. The images that are selected by the operator that can be projected by the IPLD 102 can originate from the central controller 150 or the image content may originate from the memory 315 of FIG. 3.

The operator of the central controller 150 can send a command to the IPLD 102 to project a first image. The processor 316 receives the command from the central controller 150 as received by the communications port 311 for the IPLD 102 to project a first image. The memory 315 may contain many files of images. Files of images may be referred to as content. The processor 316 upon receiving the command to project a first image may transfer the first set of first image data, such as the first set of first image data 10 of FIG. 1 The swap function applied to the first image to create a second image is part of at least one embodiment of the present invention from the memory 315 to the image control 312. The image control 312 uses the first set of first image data 10 to map out the plurality of pixels and send the appropriate control signals needed to create the separate colored images 20r, 20g, and 20b for the red light valve 375, the blue light valve 376 and the green light valve 378, respectively. The three separate images 20r, 20g, and 20b, of red, green and blue, respectively are then combined by the combining system 369 and imaged by the lens 368. The lens 368 projects the combined separate colored images to be sent through the aperture 240 in the direction of arrow 380 to be projected upon the projection surface 420 as the projected first image, such as projected image 100 shown in FIG. 1.

The image control 312 may apply a swap function of an embodiment of the present invention to the first set of first image data 10 so that the control signals sent by the image control 312 that would originally be routed to control the first light valve 375 used to form the first separate colored image (which could be red for example) are directed away from the red light valve 375 and are redirected to the second light valve 377 used to form the second separate colored image (which could be the green or blue light valve for example). The swap function can be applied by the control system 327 or the image control 312 to the first set of first image data 10 when a swap command is sent from the central controller 150 over the communications system to be received by the communications port 311 of IPLD 102. The communications port 311 forwards the swap command to the microprocessor 316 where it is operated upon in accordance with the operating system stored in the memory 315. The microprocessor 316 sends control signals to the image control 312 to apply the swap function to the first set of first image data 10. The first set of first image data 10 contains separate color data 10r, 10g, and 10b, used to form the separate colored images of red, green and blue, respectively that make up the first image 100. The swap function is applied to the first set of first image data 10 by the control system 327 or the image control 312 by electronically redirecting the separate color data to form any of the separate colored images. The swap function redirects the separate color data from the first set of first image data 10 to create a first set of second image data 510 The first set of second image data 510 is comprised of sets of data 510r, 510g and 510b shown by FIG. 5. The first set of second image data 510 is used to form the separate colored images 520r, 520g, and 520b respectively, that are in turn used to project a second image 500. The second image data 510 may also be stored in the memory 315 of the IPLD 102 or in the memory of the central controller 150 for later recall and upon recall used to create a second projected image, such as image 500. Memory can be in the form of electronic, magnetic or optical storage for example.

When a second image 500 is projected by the IPLD 102 the projected second image 500 may contain many of the same visual proportions or layout as the first image 100 as projected from the first set of first image data 10. The separate colored images of red, green and blue may have their colors swapped. For example, the first set of first separate color data 10r used to create the red separate colored image 20r in the configuration of FIG. 1 as derived from the first set of first image data 10 may be redirected to create a green separate colored image 520g in the configuration of FIG. 5

Figure 5:
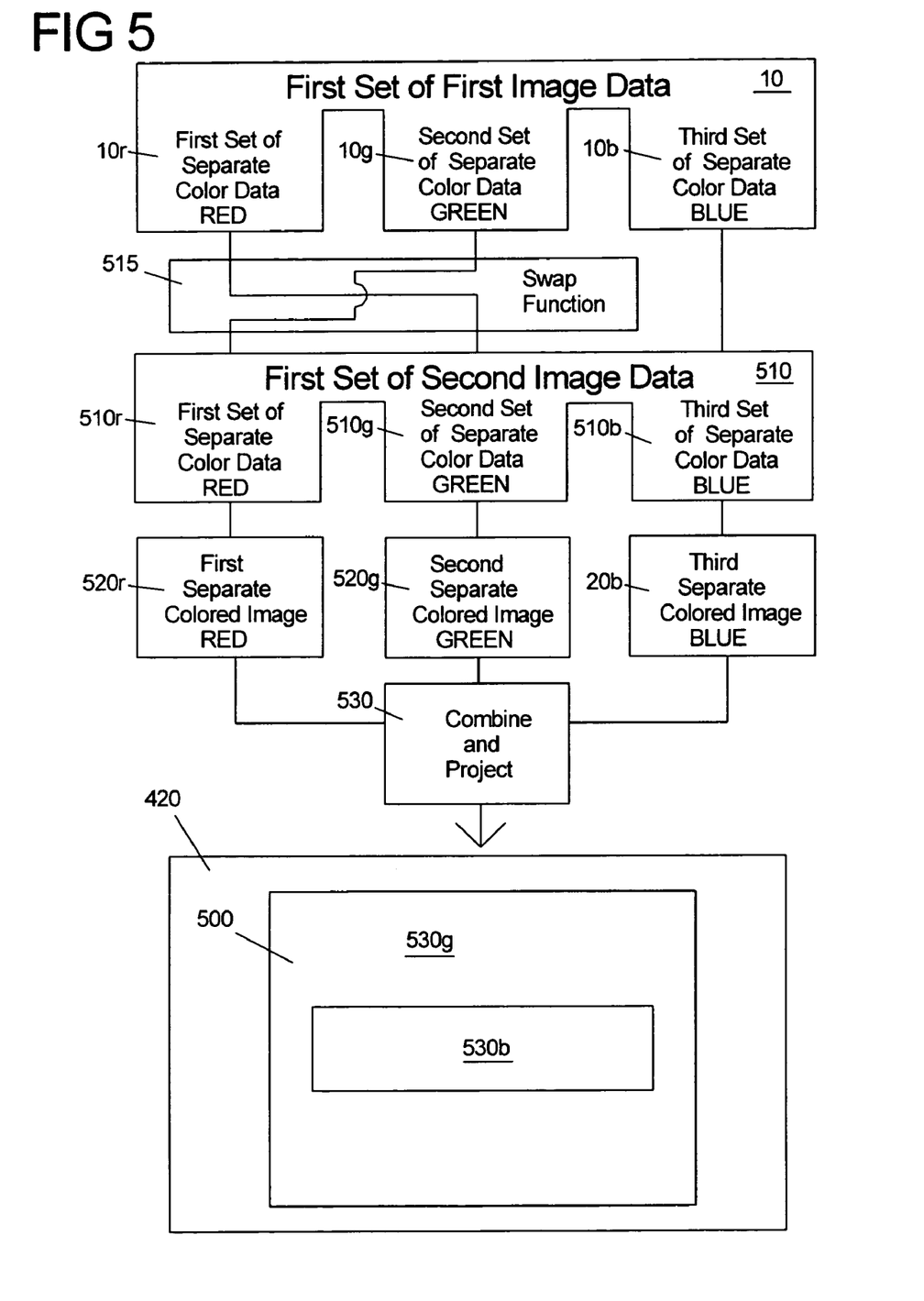
FIG. 5 shows a block diagram which describes a swap function of one or more embodiments of the present invention being applied to a first set of first image data creating a second image.

FIG. 5 shows a block diagram of a swap function of an embodiment of the present invention 515 being applied to the first set of first image data 10 to create a second image 500. The first set of first image data 10 has first image data components 10r, 10g, and 10b used to form separate colored images. Data component 10r is the first set of first separate color data, data component 10g is the second of second separate color data, and data component 10b is the third set of third separate color data. The swap function 515 is applied to redirect the first set of first separate color data 10r to form the second separate colored image 520g. The swap function 515 is also applied to redirect the second set of second separate color data 10g to form the first separate colored image 520r. The third set of third separate color data 10b is not redirected by this particular example swap function and is converted by any suitable means to form the third separate colored image 20b. Data at locations 511, 512, and 513 may be considered to be the first set of second image data 510.

The three separate colored images 520r (red), 520g (green) and 20b (blue) are combined and projected by any suitable means to project the second image 500 onto the projection surface 420. The layout of the second projected image 500 is shown visually similar to the layout of the first projected image 100 except the red background shown as 30r of the first projected image 100 has been changed to the green background 530g of 500. The blue stripe 30b of 100 remains the same blue stripe 30b or 530b as the third set of third separate color data 10b was not redirected by the swap function 515 and still forms the third separate colored image 20b. Of course it can be seen that a swap function could be applied to redirect 10r, 10g and 10b to form any of the first, second or third separate colored images. It is also possible for the swap function to redirect all or a portion of the separate color data to form any of the first, second or third separate colored images.

The swapping function of one or more embodiments of the present invention is useful for creating several different color schemes from the first image. This is useful when the operator of the lighting system desires to change the color scheme of an aerial image that may be the first image. Graphical first images projected onto a projection surface also can have the swap function applied resulting in new and interesting color schemes that were not readily available in the first set of first image data.

The swapping function of the invention can be applied to IPLDs that use multiple light valves to create the separate colored images or IPLDs that use sequential color wheels and a single light valve to produce the separate colored images. Sequential color systems and a single light valve used to create the separate colored images are known in the art.

The swapping function of the invention can be applied to the first set of first image data, such as data 10, by the control system 327 or if the first image data resides at the central controller 150 the swapping function can be applied to the first image data 10 by the processing system (not shown) of the central controller 150 creating the second image, such as image 500. The operator of the central controller 150 can call up the first image data, such as 10, stored in the memory (not shown) of the central controller 150 and apply the swap function of the present invention by inputting to the input keyboard 154 or input devices 156 creating second image data, such as data 510. The second image data is the first image data with the swap function applied in data form that can be used as data to form the separate colored images. The central controller 150 may then send the second image data, such as data 510, over the communications system to be received at the communication port 311 by IPLD 102 or IPLD 104 as digital data and processed by the processor 316 and the image control 312. The second image data can then be projected upon the projection surface 420 or as an aerial by the IPLD 102.

The swap function of the invention can also be applied to the first set of first image data, such as data 10, by a technician inputting to the input keypad 325 of FIG. 3 of the IPLD 102. The input keypad 325 can send control commands to the processor 316 that can act in accordance with the operating software stored in the memory 315 to apply the swap function to the first image data, such as data 10, to create the second image.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method of lighting a stage, the method comprising
   creating a projected second image from a first set of first image data for projection by an image projection lighting device:
   applying a swap function to the first set of first image data; and
   wherein the swap function causes a first component of the first set of first image data intended for operation of a first separate colored image to be redirected for operation of a second separate colored image and the second separate colored image is a component of the projected second image.

2. The method of claim 1 wherein
   the swap function further causes a second component of the first set of first image data intended for operation of a second separate colored image to be redirected for operation of a third separate colored image and the second and third separate colored images are components of the projected second image.

3. The method of claim 1 wherein
   the swap function is applied to the first set of first image data when a command is received by the image projection lighting device over a communications system connected between the image projection lighting device and a central controller.

4. The method of claim 1 wherein
   the first set of first image data is stored in the memory of a central controller and the swap function is applied to the first set of image data by the central controller.

5. The method of claim 4 wherein
   the application of the swap function is initiated by an operator of the central controller inputting a command into an input entry device of the central controller.

6. A method of lighting a stage, the method comprising
   projecting a first projected image from an image projection lighting device, wherein the first projected image is determined by a first set of first image data;
   applying a swap function to the first set of first image data;
   projecting a second projected image from the image projection lighting device created from the first set of first image data after the swap function has been applied;

wherein the swap function causes a first component of the first set of first image data used to provide operation of a first separate colored image of the first projected image to be redirected for operation of a second separate colored image of the second projected image.

7. The method of claim 6 wherein
the step of applying the swap function to the first set of first image data to create the second projected image visually provides a second projected image with a similar layout as the first projected image but with a different color scheme.

8. The method of claim 6 wherein
the step of applying the swap function to the first set of first image data is initiated when a command is received by the image projection lighting device over a communications system connected between the image projection lighting device and a central controller.

9. The method of claim 6 wherein
the first set of first image data is stored in a memory of a central controller and the swap function is applied to the first set of first image data by the central controller.

10. The method of claim 9 wherein
the step of applying the swap function is initiated by an operator of the central controller inputting a command into an input entry device of the central controller.

11. The method of claim 7 wherein
the first and second projected images are projected onto an airborne particulate created by a theatrical fog or smoke machine.

12. A method of lighting a stage, the method comprising
creating a first set of second image data from a first set of first image data used for projection of images by an image projection lighting device:
applying a swap function to the first set of first image data stored in a memory of the image projection lighting device to create the first set of second image data;
wherein the swap function causes a first component of the first set of first image data intended for operation of a first separate colored image of the image projection lighting device to be redirected for the intended operation of a second separate colored image of the image projection lighting device; and
wherein after creating the first set of second image data the first set of second image data is stored in a memory of the image projection lighting device.

13. The method of claim 12 wherein
the step of applying the swap function is initiated by a command received over a communications system connected to the image projection lighting device.

14. A method of lighting a stage, the method comprising
creating a first set of second image data from a first set of first image data stored in a memory of a central controller used to communicate commands to a plurality of image projection lighting devices;
applying a swap function to the first set of first image data to create a first set of second image data;
wherein the swap function causes a first component of the first set of first image data intended for operation of a first separate colored image of a first image projection lighting device of the plurality of image projection lighting devices to be redirected for the operation of a second separate colored image of the first image projection lighting device; and
wherein the first set of second image data is stored in the memory of the central controller.

15. The method of claim 14 wherein
the step of applying the swap function is initiated by an operator of the central controller inputting a command into the central controller.

* * * * *